(12) United States Patent
Menge

(10) Patent No.: US 9,804,276 B2
(45) Date of Patent: Oct. 31, 2017

(54) SCINTILLATION PIXEL ARRAY, RADIATION SENSING APPARATUS INCLUDING THE SCINTILLATION PIXEL ARRAY AND A METHOD OF FORMING A SCINTILLATION PIXEL ARRAY

(71) Applicant: SAINT-GOBAIN CERAMICS & PLASTICS, INC., Worcester, MA (US)

(72) Inventor: Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/877,328

(22) Filed: Oct. 7, 2015

(65) Prior Publication Data

US 2016/0139277 A1 May 19, 2016

Related U.S. Application Data

(63) Continuation of application No. 14/025,598, filed on Sep. 12, 2013, now Pat. No. 9,182,503.

(60) Provisional application No. 61/707,993, filed on Sep. 30, 2012.

(51) Int. Cl.
*G01T 1/20* (2006.01)
*G01T 1/164* (2006.01)

(52) U.S. Cl.
CPC .......... *G01T 1/2002* (2013.01); *G01T 1/1644* (2013.01); *G01T 1/2006* (2013.01); *G01T 1/2018* (2013.01); *Y10T 29/49826* (2015.01)

(58) Field of Classification Search
CPC ... G01T 1/1644; G01T 1/2018; G01T 1/2006; G01T 1/2002
See application file for complete search history.

(56) References Cited

U.S. PATENT DOCUMENTS

| | | | |
|---|---|---|---|
| 5,241,180 A | 8/1993 | Ishaque et al. | |
| 5,281,821 A | 1/1994 | Antich et al. | |
| 6,298,113 B1 * | 10/2001 | Duclos | G01T 1/2002 250/367 |
| 6,302,959 B2 | 10/2001 | Srivastava et al. | |
| 6,516,044 B1 | 2/2003 | Lyons | |
| 6,921,909 B2 | 7/2005 | Nagarkar et al. | |
| 7,057,187 B1 | 6/2006 | Yun et al. | |
| 7,355,180 B2 | 4/2008 | Tonami et al. | |

(Continued)

FOREIGN PATENT DOCUMENTS

| | | |
|---|---|---|
| WO | 2011/060166 | 5/2011 |
| WO | 2014/052029 | 4/2014 |

OTHER PUBLICATIONS

Interntional Search Report for PCT/US2013/059514 dated Dec. 10, 2013, 1 pg.

*Primary Examiner* — David Porta
*Assistant Examiner* — Mindy Vu
(74) *Attorney, Agent, or Firm* — Abel Law Group, LLP; Robert N. Young

(57) ABSTRACT

The disclosure relates to a scintillation pixel array, a radiation sensing apparatus, a scintillation apparatus, and methods of making a scintillation pixel array wherein scintillation pixels have beveled surfaces and a reflective material around the beveled surfaces. The embodiments described herein can reduce the amount of cross-talk between adjacent scintillation pixels.

20 Claims, 5 Drawing Sheets

(56) References Cited

U.S. PATENT DOCUMENTS

| | | |
|---|---|---|
| 9,182,503 B2 | 11/2015 | Menge |
| 2004/0042585 A1* | 3/2004 | Nagarkar .................. G21K 4/00 378/98.8 |
| 2005/0104000 A1 | 5/2005 | Kindem et al. |
| 2008/0310585 A1* | 12/2008 | Ikhlef ................... G01T 1/2985 378/19 |
| 2009/0294683 A1 | 12/2009 | Perna |
| 2010/0054415 A1* | 3/2010 | Olivo ..................... G01N 23/04 378/85 |
| 2010/0148074 A1 | 6/2010 | Menge et al. |
| 2011/0001054 A1* | 1/2011 | Frank ........................ G01T 1/20 250/370.11 |
| 2014/0091223 A1 | 4/2014 | Menge |

\* cited by examiner

SCINTILLATION PIXEL ARRAY, RADIATION SENSING APPARATUS INCLUDING THE SCINTILLATION PIXEL ARRAY AND A METHOD OF FORMING A SCINTILLATION PIXEL ARRAY

CROSS-REFERENCE TO RELATED APPLICATION

This application is a continuation of and claims priority under 35 U.S.C. §120 to U.S. patent application Ser. No. 14/025,598, filed Sep. 12, 2013 and entitled "SCINTILLATION PIXEL ARRAY, RADIATION SENSING APPARATUS INCLUDING THE SCINTILLATION PIXEL ARRAY AND A METHOD OF FORMING A SCINTILLATION PIXEL ARRAY" by Peter R. Menge, which claims priority under 35 U.S.C. §119(e) to U.S. Provisional Patent Application No. 61/707,993 entitled "SCINTILLATION PIXEL ARRAY, RADIATION SENSING APPARATUS INCLUDING THE SCINTILLATION PIXEL ARRAY AND A METHOD OF FORMING A SCINTILLATION PIXEL ARRAY," by Peter R. Menge, filed Sep. 30, 2012, both of which applications are assigned to the current assignee hereof and incorporated herein by reference in their entireties.

FIELD OF THE DISCLOSURE

This disclosure relates to scintillation pixel arrays, radiation sensing apparatuses, and methods of making a scintillation pixel array.

DESCRIPTION OF RELATED ART

Scintillator-based detectors are used in a variety of applications, including research in nuclear physics, oil exploration, field spectroscopy, container and baggage scanning, and medical diagnostics. When a scintillator material of the scintillator-based detector is exposed to a particular radiation, the scintillator material captures energy of incoming radiation and scintillates, re-emitting at least some of the absorbed energy in the form of photons. Further improvements of scintillator-based detectors are desired.

BRIEF DESCRIPTION OF THE DRAWINGS

Embodiments are illustrated by way of example and are not limited by the accompanying figures.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the scintillation and radiation detection arts.

Figure 1:
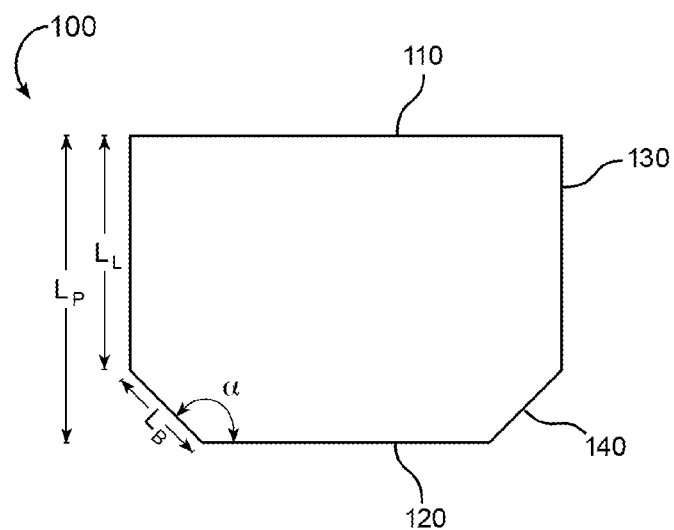
FIG. 1 illustrates a cross section of a scintillation pixel in accordance with an embodiment described herein.

A scintillation pixel array and a radiation sensing apparatus can include a plurality of beveled scintillation pixels and a reflective material disposed about the scintillation pixel. In a particular aspect, the reflective material covers less than approximately 99% of the beveled surface. In another aspect, the reflective material extends laterally about the beveled surfaces thereby creating void space. In another aspect, the reflective material can be disposed along substantially none of the beveled surfaces. Cross-talk between scintillation pixels is thus improved to an unexpectedly large degree. Non-limiting embodiments as described below help to provide a better understanding of the concepts described herein FIG. 1 illustrates a scintillation pixel 100 in accordance with an embodiment. The scintillation pixel 100 can have a proximal end 110, a distal end 120 opposite the proximal end 110, a longitudinally extending surface 130 adjacent the distal end, and a beveled surface 140 between the distal end 120 and the longitudinally extending surface 130. The scintillation pixel 100 can have four longitudinally extending surfaces 130 and four beveled surfaces 140 between the four longitudinally extending surfaces 130 and the distal end 120. Each of the distal end 120 and the proximal end 110 can have four sides. In an embodiment, the scintillation pixel can take the form of a polygon having a substantially flat surface at the distal end 120 and proximal end, four longitudinally extending surfaces adjacent a respective side of the proximal end, and four beveled surfaces extending between a respective of side of the distal end 120 and a respective longitudinally extending surface 130. In certain other embodiments, the scintillation pixel 100 can have a variety of different shapes. For example, in certain embodiments, the scintillation pixel 100 can have less than or more than four surfaces. The beveled surface can form an angle α of approximately 135° with the distal end 120. In certain embodiments, the beveled surface 140 can form and angle α of greater than approximately 90°, greater than approximately 105°, greater than approximately 120°, or greater than approximately 130° with the distal end 120. In certain embodiments, the beveled surface 140 can form and angle α of less than approximately 180°, less than approximately 165°, less than approximately 150°, or less than approximately 140° with the distal end 120. In certain embodiments, the beveled surface 140 can form and angle α of from greater than 90° to less than 180°, from approximately 105° to approximately 165°, from approximately 120° to approximately 150°, or from approximately 130° to approximately 140° with the distal end 120.

The beveled surface 140 can have a length $L_B$, and the scintillation pixel 100 can have a length $L_P$. In certain embodiments, a ratio of the length of the beveled surface $L_B$ to the length of the scintillation pixel $L_P$ can be greater than approximately 1:10, greater than approximately 1:8, or greater than approximately 1:6. In certain embodiments, a ratio of the length of the beveled surface $L_B$ to the length of the scintillation pixel $L_P$ can be of less than approximately 1:2, less than approximately 1:3, or less than approximately 1:4. A ratio of the length of the beveled surface $L_B$ to the length of the scintillation pixel $L_P$ can be in a range of approximately 1:10 to approximately 1:2, from approximately 1:8 to approximately 1:3, or from approximately 1:6 to approximately 1:4.

In certain embodiments, the beveled surface 140 can having a length $L_B$ of greater than approximately 0.1 mm, greater than approximately 0.5 mm, or greater than approximately 1 mm. In certain embodiments, the beveled surface 140 can having a length $L_B$ of less than approximately 25 mm, less than approximately 15 mm, or less than approximately 8 mm. In certain further embodiments, the beveled surface 140 can have a length $L_B$ in a range of approximately 0.1 to approximately 25 mm, approximately 0.5 to approximately 15 mm, or approximately 1 to approximately 8 mm.

In an embodiment, the scintillation pixel 100 can include an alkali halide scintillator, alkaline halide scintillator, lanthanide halide scintillator, elpasolite scintillator, or combinations thereof. In certain embodiments, the scintillation pixel 100 can include NaI(Tl), CsI(Tl or Na), LaBr$_3$(Ce), CeBr$_3$, SrI$_2$(Eu), LuSiO$_5$(Y and Ce), Cs$_2$LiYCl$_6$(Ce), Bi$_4$Ge$_3$O$_{12}$, CdWO$_4$, Gd$_2$O$_2$S(Pr or Ce) or combinations thereof.

Figure 2:
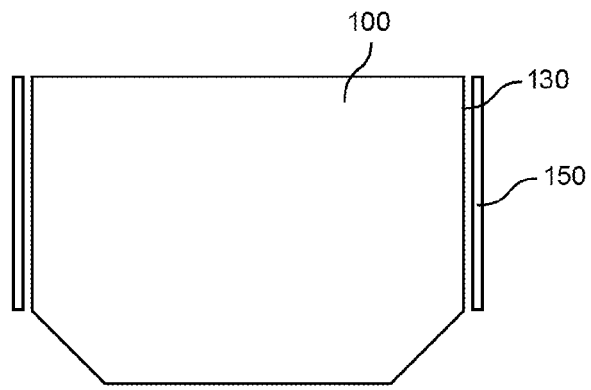
FIG. 2 illustrates a cross section of a scintillation pixel and a reflective material in accordance with an embodiment described herein.

Referring now to FIG. 2, a reflective material 150 can be disposed along the longitudinally extending surfaces 130, thereby substantially surrounding the scintillation pixel 100. The reflective material 150 can include a metal foil, polytetrafluoroethylene (PTFE), a polyester, a white epoxy, or another suitable material capable of reflecting light emitted by the scintillation pixel 100. The reflective material 150 can be disposed along any desired amount of the longitudinally extending surface 130. For example, the reflective material 150 can be disposed along substantially all of the length $L_L$ of the longitudinally extending surface 130, or greater than approximately 25%, greater than approximately 45%, greater than approximately 65%, greater than approximately 85%, or greater than approximately 95% of the length $L_L$ of the longitudinally extending surface 130. As illustrated in FIG. 2, the reflective material 150 can end at the longitudinally surface 130 and be disposed along substantially none of the beveled surface 140.

Figure 3:
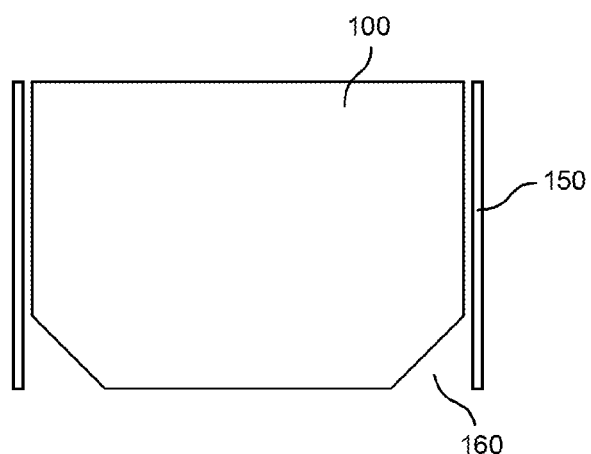
FIG. 3 illustrates a cross section of a scintillation pixel and a reflective material in accordance with an embodiment described herein.

In certain other embodiments, as particularly illustrated in FIG. 3, the reflective material 150 can continue to extend longitudinally past the beveled surface 140, thereby creating void space 160 between the reflective material 150 and the beveled surface 140 of the scintillation pixel 100.

Figure 4:
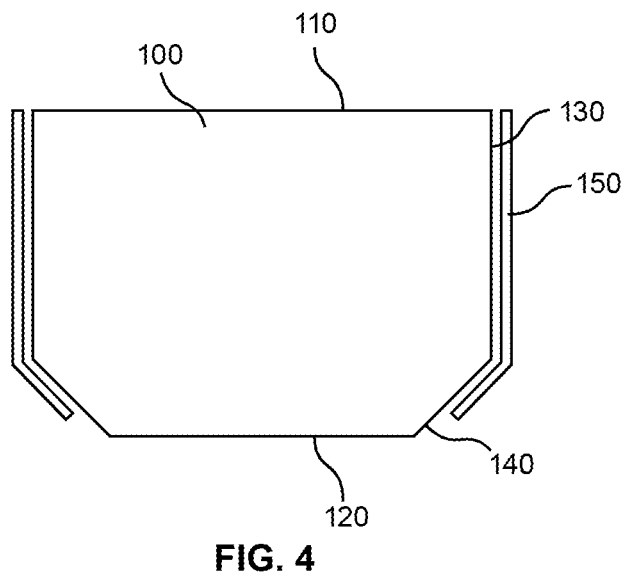
FIG. 4 illustrates a cross section of a scintillation pixel and a reflective material in accordance with an embodiment described herein.

In certain embodiments, as particularly illustrated in FIG. 4, the reflective material 150 can also be disposed along a portion of the length $L_B$ of the beveled surface 140, but less than the entire length of the beveled surface 140. For example, the reflective material 150 can be disposed along less than approximately 99%, less than approximately 50%, less than approximately 20%, less than approximately 9% along the length $L_B$ of the beveled surface 140.

In certain embodiments, the reflective material 150 can be disposed along each of the four longitudinally extending surfaces 130 and beveled surfaces 140 as described above. In certain other embodiments, each of the longitudinally extending surfaces 130 or beveled surfaces 140 can have a different amount of reflective material 150 disposed along it. For example, at least one longitudinally extending surface 130 may not have a reflective material 150 disposed along it or can have less than other longitudinally extending surfaces 130. After reading this specification, skilled artisans will understand that a variety of different patterns of reflective material 150 are within the scope described herein.

Figure 5:
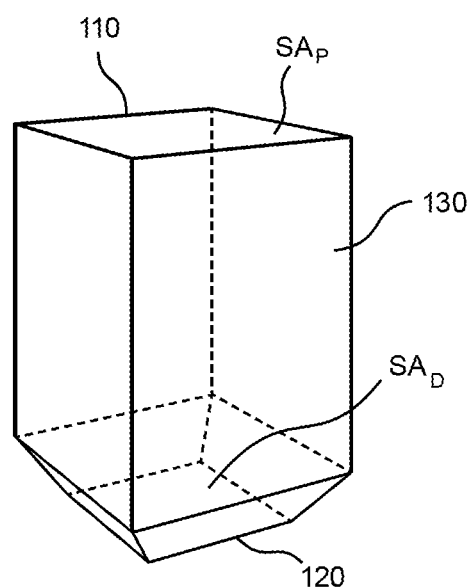
FIG. 5 illustrates a perspective view of a scintillation pixel in accordance with an embodiment described herein.

Referring now to FIG. 5, the proximal end 110 can have a surface area $SA_P$ and the distal end 120 can have a surface area $SA_D$. The scintillation pixel 100 can have a ratio of the surface area $SA_D$ of the distal end 120 to a surface area $SA_P$ of the proximal end 110 of greater than approximately 0.3:1, greater than approximately 0.5:1, or greater than approximately 0.6:1. The scintillation pixel 100 can have a ratio of the surface area $SA_D$ of the distal end 120 to a surface area $SA_P$ of the proximal end 110 of less than approximately 0.99:1, less than approximately 0.8:1, or less than approximately 0.7:1. The scintillation pixel 100 can have a ratio of the surface area $SA_D$ of the distal end 120 to a surface area $SA_P$ of the proximal end 110 of from approximately 0.3:1 to approximately 0.99:1, approximately 0.5:1 to approximately 0.8:1, or approximately 0.6:1 to approximately 0.7:1.

Figure 6:
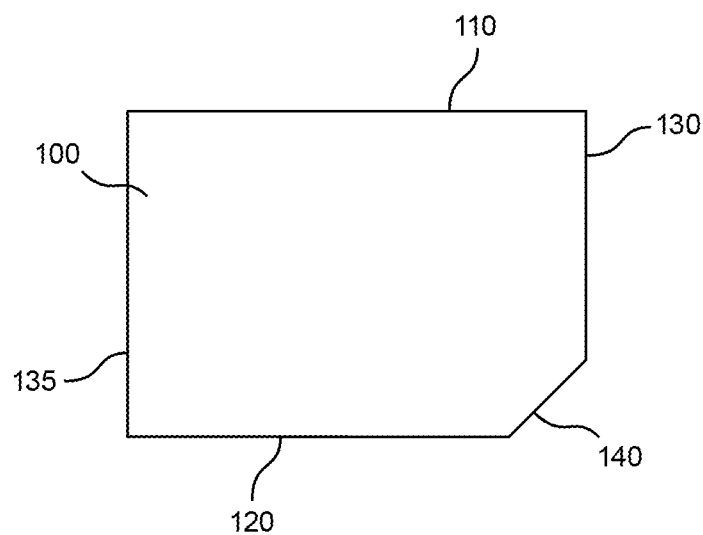
FIG. 6 illustrates a cross section of a scintillation pixel in accordance with an embodiment described herein.

Referring now to FIG. 6, a scintillation pixel 100 has a proximal end 110, a distal end 120 opposite the proximal end 110, a longitudinally extending surface 130 adjacent the proximal end 120, and a beveled surface 140 between the distal end 120 and the longitudinally extending surface 130. In the embodiment illustrated in FIG. 6, at least one longitudinally extending surface 135 is adjacent to both the proximal end 110 and the distal end 120. In particular embodiments at least one side of the scintillation pixel 100 may not have a beveled surface 140.

Figure 7:
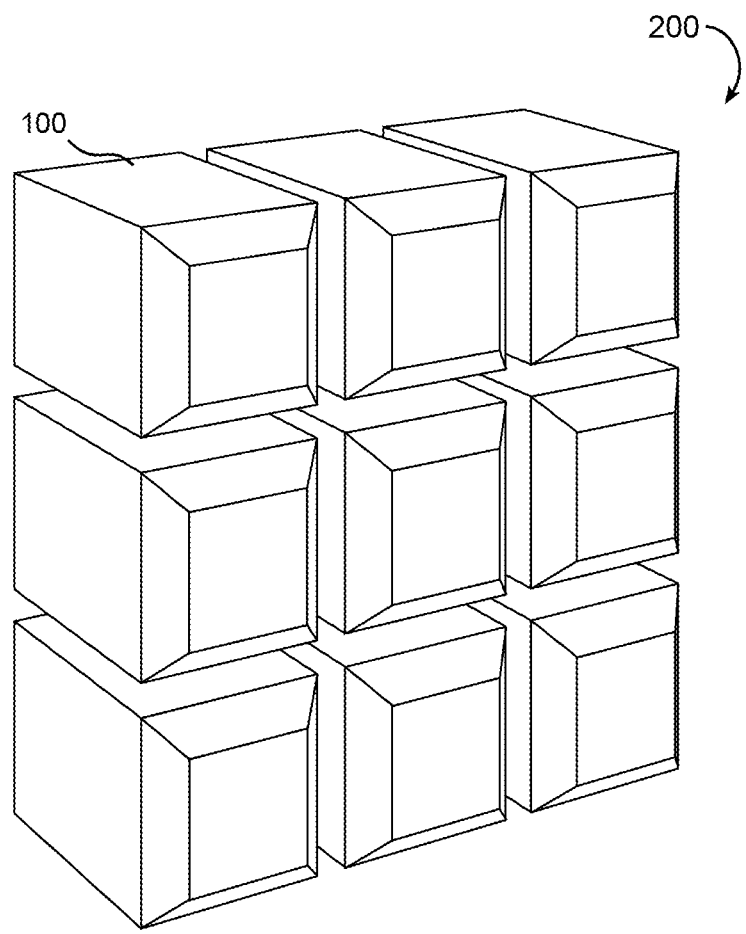
FIG. 7 illustrates a perspective view of a scintillation pixel array in accordance with an embodiment described herein.

Referring now to FIG. 7, a scintillation pixel array 200 has a plurality of scintillation pixels 100 as described in FIG. 1. Any scintillation pixel, for example, as described herein, can be arranged in the scintillation array. The scintillation pixel array 200 can contain any number of desired pixels. For example, the scintillation pixel array 200 can contain greater than 2 scintillation pixels, greater than 10, greater than 20, greater than 50, greater than 100, or greater than 200. The scintillation pixel array 200 can have the plurality of scintillation pixels 100 arranged in any desired configuration. In an embodiment, the plurality of scintillation pixels 100 in the pixel array 200 can be arranged in rows and columns.

Figure 8:
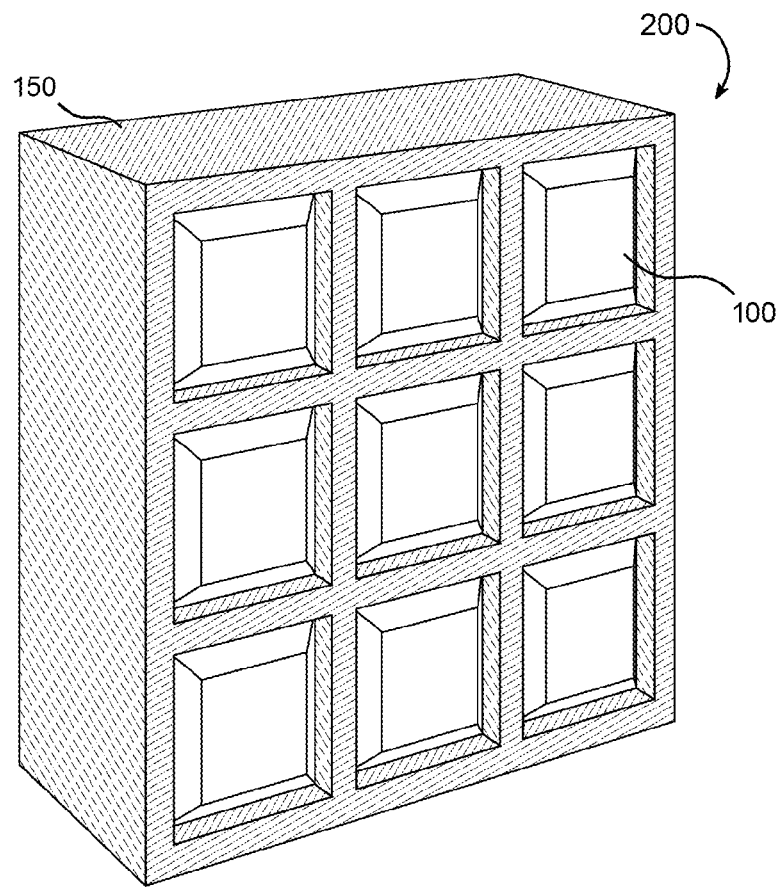
FIG. 8 illustrates a perspective view of a scintillation pixel array and a reflective material in accordance with an embodiment described herein.

Referring now to FIG. 8, a scintillation pixel array 200 has a plurality of scintillation pixels 100 as described in FIG. 1 and a reflective material 150 disposed between the longitudinally extending surfaces 130 of at least two scintillation pixels 100. The reflective material 150 can be disposed about the plurality of the scintillation pixels 100 in any manner described herein.

Figure 9:
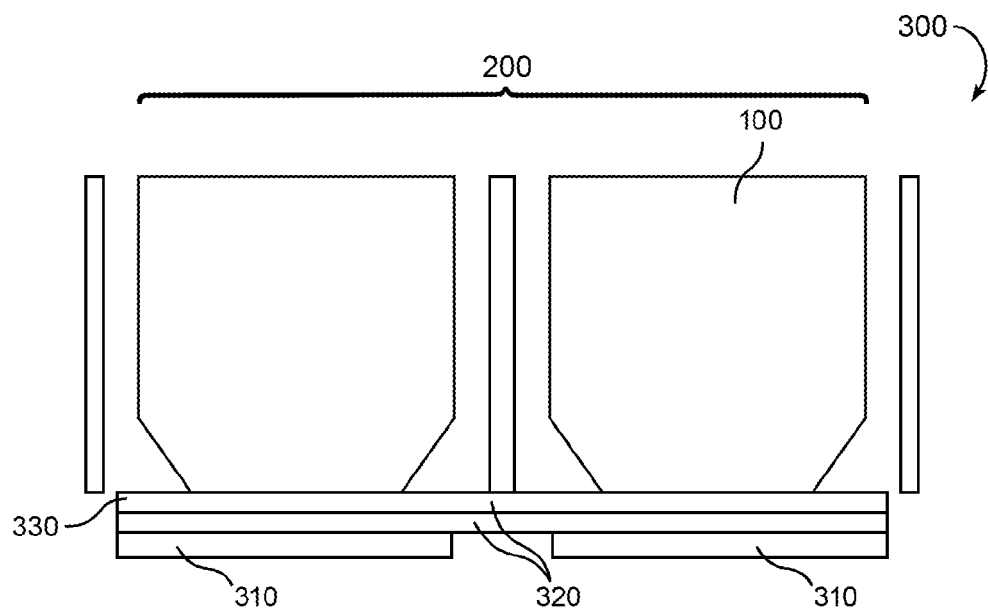
FIG. 9 illustrates a schematic of a radiation sensing apparatus in accordance with an embodiment described herein.

FIG. 9 illustrates a radiation sensing apparatus 300 in accordance with an embodiment. The radiation sensing apparatus 300 can include, for example, a medical imaging apparatus, a well logging apparatus, a neutron detection apparatus, or a security inspection apparatus. In an embodiment, the radiation sensing apparatus 300 can include or be a component of a Computed Tomography ("CT") apparatus, a Single Positron Emission Computer Tomography ("SPECT") apparatus, or a Positron Emission Tomography ("PET") apparatus, such as a time-of-flight PET apparatus.

The radiation sensing apparatus 300 can include a photon sensor 310, an optical interface 320, and a scintillation pixel array 200. The radiation sensing apparatus 300 can include at least two adjacent scintillation pixels 100 optically coupled to at least two adjacent photon sensors 310. The photon sensor 310 can be a photodiode, a photomultiplier tube ("PMT"), a silicon photomultiplier ("SiPM"), an avalanche photodiode ("APD"), or a hybrid PMT that includes a photocathode and an electron sensor. In an embodiment, the optical interface 320 can comprise an optical coupling material, such as an organic polymer or another suitable optical coupling material. For example, the optical coupling material can include a silicone rubber, an epoxy, a plastic, or any combination thereof. The optical coupling material can have a thickness in a range of approximately 0.01 to approximately 10 mm, from approximately 0.05 mm to approximately 6 mm, or from approximately 0.1 mm to approximately 4 mm.

In another embodiment, the optical interface 320 includes a window 330 disposed between the photon sensor 310 and the scintillation pixel 100. The window 330 can be optically coupled to the photon sensor 310 and the scintillation pixel 100 via an optical coupling material. In an embodiment, the window 330 includes quartz, sapphire, or an aluminum oxynitride. Although the photon sensor 310, the optical interface 320, and the scintillation pixel 100 are illustrated as coupled, the photon sensor 310 and the scintillation pixel 100 can each be adapted to be spaced apart from the optical interface 320, with the optical interface 320 disposed between the photon sensor 310 and the scintillation device 200. In other embodiments, the optical interface 320 may not include the window 330 and can include one or more layers of optical coupling material. Additionally, the optical interface 320 can include the window 330 and not include the optical coupling material. In certain embodiments, the window can have a thickness in a range of approximately 0.1 mm to approximately 35 mm or approximately 1 mm to approximately 25 mm.

The optical interface can be substantially clear. In an embodiment, the plurality scintillation pixels 100 can have an index of refraction, and the optical interface 320 can have one or more indexes of refraction that are different from the index of refraction of the scintillation pixel 100. For example, the window 330, one of a plurality of layers of the optical coupling material, or combinations thereof, can have an index of refraction that is different from the index of refraction of the scintillation pixel 100. In a particular embodiment, one or more of the indexes of refraction of the optical interface 320, the window 330, or any combination thereof can have a lower index of refraction than the index of refraction of the scintillation pixel 100.

The photon sensor 310 can have a surface area of the top surface. In certain embodiments, a ratio of the surface area of a light receiving surface of the photon sensor to a surface area of the distal end of the scintillation pixel can be in a range of greater than approximately 1:1 to approximately 10:1, from approximately 1.5:1 to approximately 5:1, or from approximately 1.5:1 to approximately 3:1.

The radiation sensing apparatus 300 can further include a shock absorbing member. The scintillation pixel 100, the reflector 150, and the shock absorbing member can be housed within a casing. The casing can include a stabilization mechanism, such as a spring, an elastomer, another suitable stabilization mechanism, or any combination thereof, interfaced to an end of the scintillation pixel 100 that is distal from the photon sensor 310. In an embodiment, the radiation sensing apparatus 300 can include more components or fewer components than those shown in FIG. 9. For example, radiation sensing apparatus 300 may not include the stabilization mechanism or the radiation sensing apparatus 300 can include multiple stabilization mechanisms, such as multiple springs. In another example, the scintillation pixel 100 can be partially surrounded by the reflector 150, for example, in any manner described herein.

The photon sensor 310 can receive photons of scintillating light emitted by the scintillation pixel 100 when the scintillation pixel 100 is exposed to one or more forms of radiation. When the photon sensor 310 receives photons from the scintillation pixel 100, the photon sensor 310 can produce electrical pulses based on numbers of photons received from the scintillation array 200. The photon sensor 310 can provide the electrical pulses to electronics that are electrically coupled to the photon sensor 310. The electrical pulses can be shaped, digitized, analyzed, or any combination thereof, by the electronics to provide a count of the photons received at the photon sensor 310 or other information. The electronics can include an amplifier, a preamplifier, a discriminator, an analog-to-digital signal converter, a photon counter, another electronic component, or any combination thereof. The photon sensor 310 can be housed within a tube or housing made of a material capable of protecting the photon sensor 310, the electronics, or a combination thereof, such as a metal, a metal alloy, other material, or any combination thereof.

Figure 10:
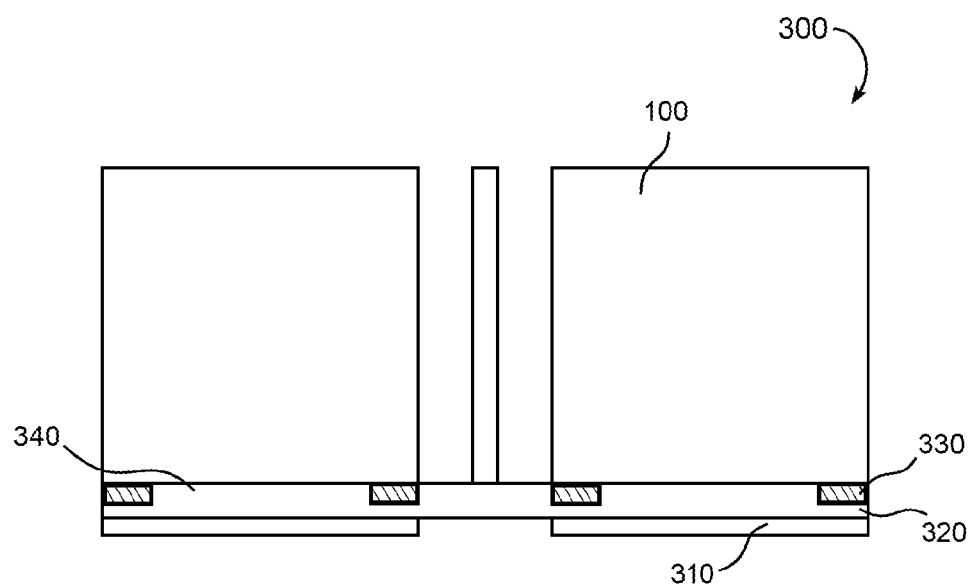
FIG. 10 illustrates a schematic of a radiation sensing apparatus including a mask in accordance with an embodiment described herein.

In certain embodiments, as particularly illustrated in FIG. 10, the radiation sensing apparatus 300 can further include a mask 330 disposed between the distal end 120 of the scintillation pixel 100 and the optical interface 320. The mask 330 can be disposed around the periphery of the distal end 120 thereby leaving an opening 340 in the center of the distal end 120. For example, the mask 330 can cover less than 50%, less than 40%, less than 30%, less than 20%, or less than 10% of the surface area of the distal end 120. As illustrated in FIG. 10, in embodiments having a mask 330, there can be no beveled surfaces on the scintillation pixel 100. In certain other embodiments, the scintillation pixel 100 can have both beveled surfaces 140 and a mask 330. The mask 330 can be made of any material capable of absorbing a photon. For example, the mask 330 can include graphite, carbon black, or ferrous ferric oxide. Similar to the beveling, having a mask 330 disposed as described increases the distance between the point at which a photon exits the scintillation pixel 100 and the surface of an adjacent photon sensor, thereby reducing the probability of cross-talk occurring.

Cross-talk can occur when photons that exit a first scintillation pixel are attributed to a second scintillation pixel when the photons are sensed by a second photon sensor that does not correspond to the first scintillation pixel. When a photon that exits a first scintillation pixel and is sensed by the nearest photon sensor, it said to be corresponding. When a photon that exits a first scintillation pixel and is sensed by a photon sensor other than the corresponding sensor, it is said to be non-corresponding. One reason for the photons exiting the first scintillation pixel being sensed by the second photon sensor instead of the first photon sensor can be the difference in refraction index of the scintillation pixel and the optical coupling material. Photons exiting the scintillation pixel will spread out in the optical interface before being sensed by the desired photon sensor. In particular, when the optical interface has a lower index of refraction that the scintillation pixel, the angle at which the photons spread out will become more oblique. Photons deflected at the more oblique angle can have a higher probability of being sensed by an undesired photon sensor. Cross-talk contributes to increased blurring of the final image produced in, for example, a medical imaging device.

A radiation sensing apparatus including the scintillation pixel array described herein can have a reduced amount of cross-talk that occurs between scintillation pixels. For example, the arrangement of the scintillation pixel having a beveled surface combined with the arrangement of the reflector described herein concentrate the photons exiting the scintillation pixel within a central region of the distal end of the scintillation pixel. One way cross-talk can be reduced with the embodiments described herein is by increasing the distance a photon must travel to be sensed by an adjacent photon sensor. Increasing this distance decreases the probability that the photon will be sensed by a non-targeted photon sensor. Another way to reduce cross talk with the embodiments described herein is the combination of beveled surfaces and the reflector arrangements as described herein is which can have the effect of deflecting the photon trajectories toward the center of the scintillation pixel, forcing the cross-talk distance to be even longer. With the radiation sensing device described herein, the cross talk between adjacent scintillation pixels can be less than approximately 5%, less than approximately 3%, or less than approximately 0.9%. By reducing the cross-talk with the embodiments described herein, the optical interface does not have to be reduced in thickness, or the optical interface material can have a greater index of refraction, or any combination thereof.

Another aspect of the present disclosure relates to a method of making a scintillation pixel array as described herein. The method can include providing a plurality of scintillation pixels. At least one scintillation pixel of the plurality of scintillation pixels has a proximal end, a distal end opposite the proximal end, and a longitudinally extending surface adjacent the proximal end. In certain embodiments, the plurality of scintillation pixels may be formed, such as, for example, cut from a single crystal. In such embodiments, the single crystal can be cut laterally one or more times and longitudinally one or more times to form a plurality of scintillation pixels. A variety of different number of scintillation pixels may be provided in accordance with the description herein.

The method also includes forming a bevel surface adjacent the distal end 120. The forming of the bevel surface can include milling, polishing, cleaving, cutting, growing, etching, extruding, casting or combinations thereof. For example, in certain embodiments, the bevel surface can be epitaxially grown on the surface of the scintillation pixel, such as by a hydride vapor phase epitaxy (HYPE) process, metal organic chemical vapor deposition (MOCVD) process or any combination thereof. In certain other embodiments, the beveled surface may be formed by cutting the scintillation pixel at angle relative to the distal end 120. In such embodiments, more than one scintillation pixel may have a beveled surface formed therein with the same cut. For example, in an arrangement of a 3×3 scintillation pixel array in rows and columns, only 12 cuts would be required to form beveled surfaces on all of the scintillation pixels. In certain embodiments, more than one method may be used to form a beveled surface on the same or different pixels within a pixel array.

The method further includes providing a reflective material along the longitudinally extending surface. The reflective material can be disposed in any configuration described herein. For example, in certain embodiments, the reflective material can be adjacent to less than approximately 99% of the beveled surface. In other examples, the reflective material can continue to extend laterally past the start of the beveled surface thereby having void space between the reflective material and the scintillation pixel. In certain embodiments, the providing of the reflective material can be performed before or after forming the beveled surface. The reflective material can be a unitary piece of material or may be a plurality of different pieces. Furthermore, in certain embodiments, the reflective material can be a sleeve. In further embodiments, the reflective material may comprise a powder material.

The method further includes arranging the plurality of scintillation pixels in an array. The forming of the bevel surface can be performed before or after arranging the plurality of scintillation pixels in an array. Moreover, in certain embodiments, the providing of the reflective material can be performed before or after arranging the plurality of scintillation pixels in an array. In certain embodiments, the scintillation pixels can be arranged in a configuration of rows and columns. The scintillation pixels may be in contact with the reflective material or may be spaced apart from the reflective material. In certain embodiments, two opposite sides of the same reflective material can be in contact with two different scintillation pixels at the same time.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a scintillation pixel array comprises a plurality of scintillation pixels, wherein at least one scintillation pixel of the plurality of scintillation pixels has a proximal end, a distal end opposite the proximal end, a longitudinally extending surface adjacent the proximal end, and a beveled surface between the distal end and the longitudinally extending surface; and a reflective material disposed along the longitudinally extending surface and less than approximately 99% of the beveled surface.

In an embodiment of the first aspect, the reflective material is disposed along a portion of or all of the longitudinally extending surfaces and along only a portion or substantially none of the angled surface.

In an embodiment of the first aspect, the beveled surface forms an angle of from greater than 90° to less than 180°, or from approximately 105° to approximately 165°, or from approximately 120° to approximately 150°, or from approximately 130° to approximately 140° with the distal end.

In a second aspect, a radiation sensing apparatus comprises the scintillation pixel array of the first aspect and a photon sensor optically coupled to the at least one of the plurality of scintillation pixels, wherein the distal end is adjacent to the photon sensor.

In an embodiment of the first aspect, the radiation sensing apparatus comprises an optical coupling material between the distal end and the photon sensor. In another embodiment, the optical coupling material is substantially clear. In another embodiment, the optical coupling material comprises silicone rubber. In another embodiment, the optical coupling material comprises an epoxy.

In another embodiment of the second aspect, the radiation sensing apparatus further comprises at least two adjacent scintillation pixels optically coupled to at least two adjacent photon sensors.

In another embodiment of the second aspect, cross talk between adjacent scintillation pixels is less than approximately 5%, less than approximately 3%, or less than approximately 0.9%.

In another embodiment of the first or second aspect, a medical imaging device comprises the scintillation pixel array or the radiation sensing apparatus.

In a third aspect, a method of making a scintillation pixel array comprises: providing a plurality of scintillation pixels, wherein at least one scintillation pixel of the plurality of scintillation pixels has a proximal end, a distal end opposite the proximal end, and a longitudinally extending surface adjacent the proximal end; forming a bevel surface adjacent the distal end; providing a reflective material along the longitudinally extending surface; and arranging the plurality of scintillation pixels in an array; wherein the reflective material is adjacent to less than approximately 99% of the beveled surface.

In an embodiment of the second aspect, forming the beveled surface is performed before arranging the plurality of scintillation pixels in an array. In another embodiment of the second aspect, forming the beveled surface is performed after arranging the plurality of scintillation pixels in an array. In another embodiment of the second aspect, the beveled surface is formed by milling or polishing. In another embodiment of the second aspect, the beveled surface is formed by cleaving.

In another embodiment of any of the first, second, or third aspects, the reflective material is disposed between the longitudinally extending surfaces of at least two scintillation pixels.

In another embodiment of any of the first, second, or third aspects, the at least one of the plurality of scintillation pixels has four longitudinally extending surfaces between the proximal end and the beveled surface, and wherein the reflective material is disposed along each of the four longitudinally extending surfaces and less than approximately 99%, less than approximately 50%, less than approximately 20%, less than approximately 9%, or substantially none of the beveled surface.

In a fourth aspect, a scintillation apparatus comprises a single scintillator having a proximal end, a distal end opposite the proximal end, a longitudinally extending surface adjacent the proximal end, and a beveled surface between the distal end and the longitudinally extending surface; and a reflective material disposed along the longitudinally extending surface and less than approximately 99% of the beveled surface.

In another embodiment of any of the first, second, third, or fourth aspects, the reflective material extends less than approximately 50%, less than approximately 20%, or less than approximately 9% of the beveled surface.

In another embodiment of any of the first, second, third, or fourth aspects, the reflective material extends to substantially none of the beveled surface.

In another embodiment of any of the first, second, third, or fourth aspects, at least one longitudinally extending surface is adjacent to the distal end.

In another embodiment of any of the first, second, third, or fourth aspects, the at least one scintillation pixel has a ratio of a surface area of the distal end to the surface area of the proximal end of from approximately 0.3:1 to approximately 0.99:1, approximately 0.5:1 to approximately 0.8:1, or approximately 0.6:1 to approximately 0.7:1.

In another embodiment of any of the first, second, third, or fourth aspects, a void space is between the reflective material and the beveled surface.

In another embodiment of any of the first, second, third, or fourth aspects, a ratio of the surface area of a light receiving surface of the photon sensor to a surface area of the distal end of the scintillation pixel is in a range of greater than approximately 1:1 to approximately 10:1, from approximately 1.5:1 to approximately 5:1, or from approximately 1.5:1 to approximately 3:1.

EXAMPLES

The concepts described herein will be further described in the following examples, which do not limit the scope of the invention described in the claims. Some of the parameters below have been approximated for convenience.

Example 1

Comparison of Radiation Sensing Apparatus in accordance with an embodiment described herein and a radiation sensing apparatus without a bevel edge.

Two scintillation pixels arrays having a 3×3 arrangement of LYSO pixels and a pixel size of 5 mm height, 5 mm width, and 5 mm length were tested in a simulation for cross talk and collection efficiency. The first scintillation pixel array (A) is a standard pixel having no beveled surfaces and a reflector substantially covering the entire longitudinally extending surfaces of the pixel. The second scintillation pixel array (B) is a pixel array as described herein having a 135° angled beveled surface over the last 1 mm and a reflector extending longitudinally along the substantially the entire length of scintillation pixel. The reflector on both arrays was diffuse RC=0.97

Figure 11:
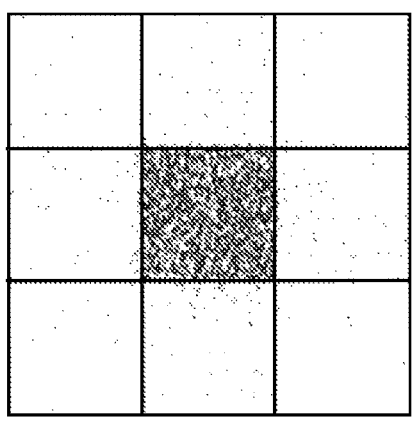
FIG. 11 illustrates simulation results using a scintillation pixel array without a beveled surface.
Figure 12:
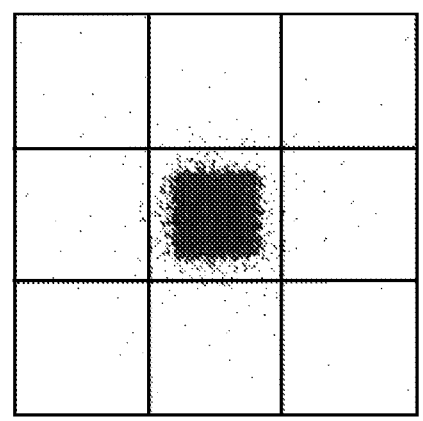
FIG. 12 illustrates simulation results using a scintillation pixel array having beveled surfaces.

The results are displayed below in Table 1 and the simulation images for A and B are illustrated in FIG. 11 and FIG. 12 respectively.

TABLE 1

| Property | A (comparison) | B |
| --- | --- | --- |
| Cross-talk | 5.4% | 0.9% |
| Collection Efficiency | 87% | 76% |

Note that not all of the activities described above in the general description or the examples are required, that a portion of a specific activity may not be required, and that one or more further activities can be performed in addition to those described. Still further, the order in which activities are listed is not necessarily the order in which they are performed.

Certain features that are, for clarity, described herein in the context of separate embodiments, can also be provided in combination in a single embodiment. Conversely, various features that are, for brevity, described in the context of a single embodiment, can also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

What is claimed is:

1. A scintillation pixel array, comprising:
   a first and second scintillation pixel, wherein each of the first and second scintillation pixel has:
      a proximal end, and
      a distal end opposite the proximal end;
   an optical interface disposed closer to the distal end than the proximal end and including an optical coupling material extending over the distal ends of the first and second scintillation pixels; and
   a first mask disposed between the distal end of the first scintillation pixel and the optical interface, wherein the first mask comprises a photon absorbing material and an opening exposing at least a portion of a surface area of the distal end of the first scintillation pixel.

2. The scintillation pixel array of claim 1, wherein the first mask is disposed around a periphery of the distal end of the first scintillation pixel.

3. The scintillation pixel array of claim 1, wherein the first mask includes graphite, carbon black, or an iron oxide.

4. The scintillator pixel array of claim 1, wherein a second mask is disposed along a periphery of the second scintillation pixel, and wherein the second mask has an opening exposing at least a portion of a surface area of the distal end of the second scintillation pixel.

5. The scintillator pixel array of claim 1, wherein the first mask is disposed such that less than 50% of the surface area of the distal end of the first scintillation pixel is covered by the mask.

6. The scintillator pixel array of claim 1, wherein each of the first and second scintillation pixel has a longitudinally extending surface between the proximal and distal ends, and a reflective material is disposed between the first and second scintillation pixels along one of the longitudinally extending surfaces.

7. A scintillation pixel array comprising a plurality of scintillation pixels including a first scintillation pixel adjacent a second scintillation pixel, wherein each of the first and second scintillation pixels has:
   a proximal end,
   a distal end opposite the proximal end;
   an optical interface coupled to the distal ends of the first and second scintillation pixels; and
   a first mask disposed along a first side of the distal end of the first scintillation pixel, between the distal end of the first scintillation pixel and the optical interface, wherein the first mask comprises a photon absorbing material and is disposed such that less than 50% of a surface area of the distal end is covered by the first mask.

8. The scintillation pixel array of claim 7, wherein the first mask is disposed such that less than 30% of a surface area of the distal end is covered by the first mask.

9. The scintillation pixel array of claim 7, wherein a second mask is spaced apart from the first mask and disposed along a second side of the distal end of the second scintillation pixel, between the distal end of the second scintillation pixel and the optical interface, wherein the first side is parallel to the second side.

10. The scintillation pixel array of claim 9, wherein the second mask is disposed such that less than 30% of a surface area of the distal end of the second scintillation pixel is covered by the second mask.

11. The scintillation pixel array of claim 7, wherein the optical interface comprises an optical coupling material, a window, or any combination thereof.

12. The scintillation pixel array of claim 11, wherein the optical coupling material comprises a silicone rubber, an epoxy, a plastic, or any combination thereof.

13. The scintillation pixel array of claim 7, wherein the scintillator pixel comprises an alkali halide scintillator, alkaline halide scintillator, lanthanide halide scintillator, elpasolite scintillator, or any combination thereof.

14. The scintillation pixel array of claim 7, wherein the scintillator pixel comprises NaI(TI), CsI(TI or Na), LaBr3(Ce), CeBr3, SrI2(Eu), LuSiO5(Y and Ce), Cs2LiYCl6(Ce), Bi4Ge3O12, CdWO4, Gd2O2S(Pr or Ce) or any combination thereof.

15. A radiation sensing apparatus, comprising:
   a scintillator array comprising a plurality of scintillation pixels including a first and second scintillation pixel, wherein each of the first and second scintillation pixels has:
      a proximal end,
      a distal end opposite the proximal end; and
      a first mask disposed around a periphery of the distal end of the first scintillation pixel, wherein the first mask includes a photon absorbing material;
   an optical interface coupled to the distal ends of the first and second scintillation pixels;
   a first photon sensor optically coupled to the distal end of the first scintillation pixel via the optical interface; and
   a second photon sensor optically coupled to the distal end of the second scintillation pixel via the optical interface.

16. The radiation sensing apparatus of claim 15, wherein the first mask is disposed such that less than 30% of a surface area of the distal end of the first scintillation pixel is covered by the mask.

17. The radiation sensing apparatus of claim 15, wherein the first mask is disposed such that less than 10% of a surface area of the distal end of the first scintillation pixel is covered by the mask.

18. The radiation sensing apparatus of claim 15, wherein a second mask is disposed around a periphery of the distal end of the second scintillation pixel.

19. The radiation sensing apparatus of claim 15, comprising a plurality of photon sensors including the first and second photon sensors, wherein the plurality of photon sensors are optically coupled to the plurality of the scintillator pixels.

20. The radiation sensing apparatus of claim 15, wherein each of the first and second photon sensors includes a photodiode, a photomultiplier tube, a silicon photomultiplier, an avalanche photodiode, or a hybrid PMT that includes a photocathode and an electron sensor.

* * * * *